US012146201B2

United States Patent
Zhang et al.

(10) Patent No.: US 12,146,201 B2
(45) Date of Patent: Nov. 19, 2024

(54) METHOD FOR INTERNAL STRESS REGULATION IN SUPERALLOY DISK FORGINGS BY PRE-SPINNING

(71) Applicants: Gaona Aero Material Co., Ltd., Beijing (CN); AECC COMMERCIAL AIRCRAFT ENGINE CO., LTD., Shanghai (CN); Zhejiang Hiro Aviation Technology Co., Ltd., Zhejiang (CN); CENTRAL IRON & STEEL RESEARCH INSTITUTE, Beijing (CN)

(72) Inventors: Beijiang Zhang, Beijing (CN); Wenyun Zhang, Beijing (CN); Chenggang Tian, Shanghai (CN); Aihua Huang, Shanghai (CN); Guodong Zhang, Shanghai (CN); Haijun Xuan, Zhejiang (CN); Chuanyong Chen, Zhejiang (CN); Shuo Huang, Beijing (CN); Heyong Qin, Beijing (CN); Qiang Tian, Beijing (CN); Ran Duan, Beijing (CN)

(73) Assignees: Gaona Aero Material Co., Ltd., Beijing (CN); AECC COMMERCIAL AIRCRAFT ENGINE CO., LTD., Shanghai (CN); Zhejiang Hiro Aviation Technology Co., Ltd., Zhejiang (CN); CENTRAL IRON & STEEL RESEARCH INSTITUTE, Beijing (CN)

( * ) Notice: Subject to any disclaimer, the term of this patent is extended or adjusted under 35 U.S.C. 154(b) by 254 days.

(21) Appl. No.: 17/378,792

(22) Filed: Jul. 19, 2021

(65) Prior Publication Data
US 2023/0016175 A1  Jan. 19, 2023

(51) Int. Cl.
*C21D 8/02* (2006.01)
*C21D 9/40* (2006.01)
(Continued)

(52) U.S. Cl.
CPC .............. *C21D 8/0221* (2013.01); *C21D 9/40* (2013.01); *C21D 11/00* (2013.01); *G01L 5/0047* (2013.01)

(58) Field of Classification Search
CPC ........ C21D 8/0221; C21D 9/40; C21D 11/00; G01L 5/0047
See application file for complete search history.

(56) References Cited

U.S. PATENT DOCUMENTS

| 4,820,356 A | 4/1989 | Blackburn et al. |
|---|---|---|
| 2010/0212422 A1 | 8/2010 | Allen et al. |

FOREIGN PATENT DOCUMENTS

| CN | 109145335 A | 1/2019 |
|---|---|---|
| CN | 110423883 | 11/2019 |

(Continued)

OTHER PUBLICATIONS

Combined Search and Exam Report under Sections 17 & 18 (3) for corresponding GB Application No. GB2110443.5 dated Dec. 30, 2021 (7 pages).

(Continued)

*Primary Examiner* — Rebecca Janssen
(74) *Attorney, Agent, or Firm* — Cooper Legal Group, LLC

(57) ABSTRACT

The present application relates to the field of superalloy, disclosing a method for internal stress regulation in superalloy disk forgings by pre-spinning. The method includes: Step S1, determining a target revolution for regulating internal stress in the disk forgings, and determining a target deformation magnitude of plastic deformation required for (Continued)

regulating the internal stress by the pre-spinning of the disk forgings; and Step S2, performing the pre-spinning of the disk forgings by the target revolution, monitoring a deformation magnitude of the disk forgings, and stopping the pre-spinning when a monitored deformation magnitude of the disk forgings reaches the target deformation magnitude.

4 Claims, 22 Drawing Sheets

(51) Int. Cl.
  *C21D 11/00* (2006.01)
  *G01L 5/00* (2006.01)

(56) References Cited

FOREIGN PATENT DOCUMENTS

| | | | |
|---|---|---|---|
| CN | 110551955 | A | 12/2019 |
| CN | 111471944 | | 7/2020 |
| CN | 111471944 | B | 7/2020 |
| CN | 110423883 | B | 8/2020 |
| CN | 112016223 | A * | 12/2020 |
| CN | 112342368 | A | 2/2021 |
| JP | H01205059 | A | 8/1989 |
| JP | 2005305358 | A | 11/2005 |
| WO | 2021044098 | A1 | 11/2021 |

OTHER PUBLICATIONS

Examination Report for corresponding AU Application No. 2021206812 dated Jul. 25, 2022 (9 pages).

* cited by examiner

Low stress (Pa)

Medium stress (Pa)

High stress (Pa)

Stress distribution under a maximum spinning speed—
Von mises equivalent stress (Pa)

Stress distribution after the spinning is stopped-chordwise (Pa)

Residual plastic deformation after the spinning is stopped —Von mises equivalent strain Residual plastic deformation after the spinning is stopped—chordwise true strain Stress distribution under a maximum spinning speed—Von mises equivalent strain (Pa)

Stress distribution under a maximum spinning speed—chordwise (Pa)

Stress distribution after the spinning is stopped—Von mises equivalent stress (Pa)

Stress distribution after the spinning is stopped -chordwise (Pa)

Residual plastic deformation after the spinning is stopped —Von mises equivalent strain Residual plastic deformation after the spinning is stopped—chordwise true strain Internal stress of the heat treatment state—Von mises equivalent stress (Pa)

Internal stress of the heat treatment state—chordwise stress component (Pa)

Stress distribution after the pre-spinning—Von mises equivalent stress (Pa)

Stress distribution after the pre-spinning — chordwise stress component (Pa)

METHOD FOR INTERNAL STRESS REGULATION IN SUPERALLOY DISK FORGINGS BY PRE-SPINNING

TECHNICAL FIELD

The present application relates to the field of materials, in particular to a method for internal stress regulation in superalloy disk forgings by pre-spinning.

BACKGROUND ART

The hot-end turning parts of aero-engine are mainly made of superalloy, including high-pressure and low-pressure turbine disks, compressor disks, middle-seal disks, etc. In order to obtain the predetermined mechanical properties on these superalloy disk pieces, it is necessary to perform organizational regulation on the forgings with a highly precisely controlled heat treatment system. In the heat treatment procedure, when the required mechanical properties are obtained, certain internal stress is inevitably introduced to the disk piece. The heat treatment stress on the forgings can be gradually released in the subsequent procedures of part machining, surface treatment, and machine service.

Excessive internal stress level can cause a relatively large deformation to a disk piece in machining, making it difficult to achieve a predetermined precise dimension on the part. At the same time, excessive and improperly distributed internal stress will degrade the dimensional stability of the members and parts in the service procedure, affecting the engine efficiency or evening causing a failure. Therefore, effective regulation of the heat treatment internal stress on a forgings is the premise and foundation for ensuring the dimensional stability of rotor disks during machining and service.

SUMMARY

The present application proposes a method for implementing a high-speed spinning treatment on disk forgings, namely acquiring a predetermined micro plastic deformation on the disk forgings by using centrifugal force load, to effectively regulate and control the stress distribution state in the disk forgings on the premise of not influencing the subsequent machining and service performance of the disk forgings. According to the method, excessive internal stress formed in the heat treatment procedure can be fully released, so as to avoid the occurrence of harmful deformation of the disk forgings in subsequent part machining procedure. Moreover, the internal stress distribution can be regulated and optimized concerning the service working conditions of the disk forgings, so as to ensure that the disk forgings do not suffer from a harmful deformation under 115% or 120% high-stress state during a procedure of a part over-spinning test, while having a long-term dimensional stability in service on a machine. The method includes a spinning operation performed on the disk forgings after heat treatment and before part machining, and thus is called billet disk pre-spinning. It is a novel technology, aiming at the disk forgings, for actively regulating the internal stress by inducing micro plastic deformation to disk forgings by a rotary centrifugal force.

In order to achieve the above object, the present application provides a method for internal stress regulation in a superalloy disk forging by pre-spinning. The method includes: Step S1, determining a target revolution for regulating internal stress in the disk forgings, and determining a target deformation magnitude of plastic deformation required for regulating the internal stress by the pre-spinning of the disk forgings; and Step S2, performing the pre-spinning of the disk forgings by the target revolution, monitoring the deformation magnitude of the disk forgings, and stopping the pre-spinning when a monitored deformation magnitude of the disk forgings reaches the target deformation magnitude.

Preferably, Step S1 includes: Step S11, obtaining a predicted revolution for regulating the internal stress in the disk forgings by simulated calculation; Step S12, performing the pre-spinning of the disk forgings by the predicted revolution, and monitoring the deformation magnitude of the disk forgings; and Step S13, adjusting the predicted revolution according to a monitored deformation magnitude of the disk forgings to determine the target revolution.

Preferably, Step S13 includes: Step S131, determining the predicted revolution as the target revolution if the monitored deformation magnitude of the disk forgings reaches the target deformation magnitude when performing the pre-spinning of the disk forgings by the predicted revolution; or Step S132, if the monitored deformation magnitude of the disk forgings is lower than the target deformation magnitude when performing the pre-spinning of the disk forgings by the predicted revolution, gradually increasing the revolution of the pre-spinning until the monitored deformation magnitude of the disk forgings reaches the target deformation magnitude when performing a final revolution of pre-spinning, and determining the final revolution as the target revolution.

Preferably, Step S132 includes: gradually increasing the revolution of the pre-spinning by a step of 25-100 rotations per minute if the monitored deformation magnitude of the disk forgings is lower than the target deformation magnitude when performing the pre-spinning of the disk forgings by the predicted revolution.

Preferably, Step S11 includes: Step S111, simulating heat treatment of the disk forgings to obtain a internal stress distribution of the disk forgings; and Step S112, simulating the pre-spinning of the disk forgings by different revolutions to determine the predicted revolution, in which the pre-spinning by the predicted revolution enables the internal stress in the disk forgings to be regulated to be 400 MPa or below and enables the residual deformation magnitude of the disk forgings to be 0.05%-1.95%.

Preferably, Step S111 includes: obtaining a internal stress distribution of the disk forgings after heat treatment by detecting an actual internal stress in the disk forgings and correcting a simulation result of the disk forgings by using the actual internal stress.

Preferably, Step S3 is further included: drawing a internal stress distribution diagram of the disk forgings after pre-spinning. Preferably, Step S3 includes: Step S31 simulating the pre-spinning of the disk forgings by the target revolution to obtain the internal stress distribution of the disk forgings after the pre-spinning; and Step S32: detecting an actual internal stress at a feature site of the disk forgings, and correcting a simulated result of the disk forgings after pre-spinning by using the actual internal stress to obtain the internal stress distribution of the disk forgings after pre-spinning;

Preferably, the target deformation magnitude is 0.05%-4.95%.

Preferably, the deformation magnitude of the disk forgings is monitored after keeping a current revolution for at least 30 seconds when performing the pre-spinning.

Preferably, when monitoring the deformation magnitude of the disk forgings, a stable value is taken as the monitored deformation magnitude of the disk forgings; and/or Step S2 includes: gradually decreasing the revolution of the pre-spinning to zero when it is monitored that the deformation magnitude of the disk forgings reaches the target deformation magnitude.

Preferably, the superalloy is a wrought superalloy, a powder superalloy, or a cast superalloy.

Preferably, the disk forgings is a disk structure without obvious stress concentration before pre-spinning, and the disk forgings includes annular disk forgings, compressor disk forgings and turbine disk forgings.

Preferably, the operating temperature of the pre-spinning is −50° C.-750° C.

Preferably, the method performs the pre-spinning by a high-speed spinning test platform and a matched tool for positioning the disk forgings on the high-speed spinning test platform.

According to the technical solution, the internal stress within the disk forgings can be effectively regulated, while the mechanical property of the disk forgings is maintained. Therefore, the deformation degree of subsequent part machining can be alleviated so as to shorten the part machining period and reduce the cost. No harmful deformation occurs in subsequent overspeed test and service life of the machined part, and thus the dimensional stability of the part can be guaranteed. By forming internal stress distribution beneficial to the working condition of the disk piece after the pre-spinning, compressive stress is placed into the hub, and the fatigue life of the disk piece can be effectively prolonged.

BRIEF DESCRIPTION OF THE DRAWINGS

FIG. 2a to FIG. 2c respectively simulate internal stress distribution states in different heat treatment process parameters according to Example 1 of the present application, in which: FIG. 2a is a state in a low internal stress level: the maximum tensile stress in the central region of the cross section of the disk forgings is 286 MPa; FIG. 2b is a state in a medium internal stress level: the maximum tensile stress in the central region of the cross section of the disk forgings is 517 MPa; and FIG. 2c is a state in a low internal stress level: the maximum tensile stress in the central region of the cross section of the disk forgings is 681 MPa;

FIG. 3a to FIG. 3d simulate distribution states of the stress and deformation of a disk forgings during pre-spinning under 0 internal stress condition according to a method of the present application, in which: FIG. 3a shows a Vonmises equivalent stress distribution state in the disk forgings when reaching a maximum spinning speed; FIG. 3b shows a distribution state of chordwise internal stress in the disk forgings after the spinning is stopped; FIG. 3c shows Vonmises equivalent plastic strain distribution in the disk forgings after the spinning is stopped; and FIG. 3d shows a chordwise component of the residual plastic strain after the spinning is stopped;

FIG. 4a to FIG. 4f shows a stress and strain distribution of a disk forgings during pre-spinning under a condition of superimposed heat treatment internal stress stimulated according to a method of the present application, in which: FIG. 4a shows a Vonmises equivalent stress distribution in a disk forgings with medium heat treatment stress when reaching a maximum spinning speed; FIG. 4b shows a chordwise stress distribution in the disk forgings with medium heat treatment stress when the spinning speed is maximum; FIG. 4c shows a Vonmises equivalent stress distribution in the disk forgings after the spinning is stopped; FIG. 4d shows a chordwise stress component after the spinning is stopped, transited from a compressive stress of −250 MPa at an inner diameter to a tensile stress of 150 MPa at an outer diameter; FIG. 4e shows a Vonmises equivalent plastic strain distribution in the disk forgings after the spinning is stopped; and FIG. 4f shows a slight plastic deformation of 0.05%-0.25% introduced into an actual part region of the disk forgings by the pre-spinning;

FIG. 5a to FIG. 5d show the variation of dimensions of a feature member of a disk forgings during pre-spinning according to a method of the present application, in which: FIG. 5a shows the relationship between the change in dimension of the disk forgings and the maximum spinning speed of the pre-spinning when there is no initial heat treatment stress ($\sigma_{initial}=0$); FIG. 5b shows the effect of heat treatment stress on the change in the outer diameter of the disk forgings, in which the greater the initial stress is, the lower the critical spinning speed required for yielding is; FIG. 5c shows the change in the dimension of the disk forgings during spinning under different initial stresses; and FIG. 5d shows that heat treatment stress has already started to have a significant effect on the variation of the outer diameter dimension of the disk forgings during increasing the spinning speed;

DETAILED DESCRIPTION

Figure 1A:
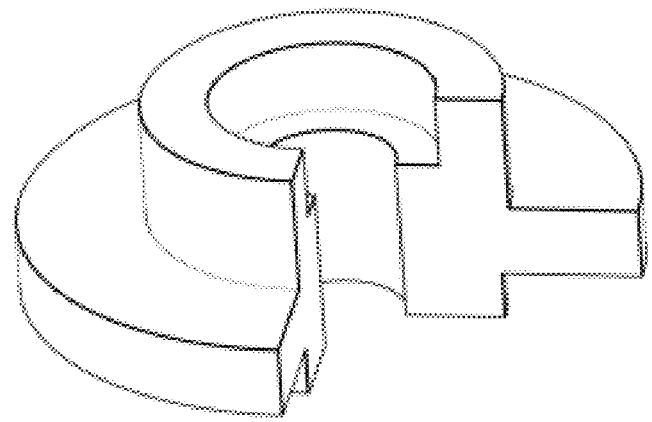
FIG. 1a is a schematic structural diagram in which disk forgings is a turbine disk.

Specific implementation modes of the present application will be described in detail below with reference to the accompanying drawings. It is to be understood that the specific implementation modes described herein is illustrative and explanatory of the present application only and is not restrictive of the present application.

In the present application, orientation wordings such as "upper, lower, left, right" are generally used to refer to upper, lower, left, and right as shown with reference to the drawings, if they are not described to the contrary; by "inner, outer" is meant the inner and outer relative to the contours of the members themselves. Hereinafter, the present application will be described in detail with reference to the accompanying drawings and implementation modes.

The present application provides a method for internal stress regulation in superalloy disk forgings by pre-spinning. The method Includes:

Step S1, determining a target revolution for regulating an internal stress in the disk forgings, and determining a target deformation magnitude of plastic deformation required for regulating the internal stress by the pre-spinning of the disk forgings; and Step S2, performing the pre-spinning of the disk forgings by the target revolution, monitoring the deformation magnitude of the disk forgings, and stopping the pre-spinning when the deformation magnitude of the disk forgings reached the target deformation magnitude.

According to the method disclosed by the present application, the internal stress in the disk forgings can be effectively regulated, while the mechanical property of the disk forgings is maintained. Therefore, the deformation degree of subsequent part machining can be alleviated so as to shorten the part machining period and reduce the cost. There is no harmful deformation occurred in subsequent overspeed test and the service life of the machined part, and thus the dimensional stability of the part is guaranteed. By forming internal stress distribution beneficial to the working condition of the disk forgings after pre-spinning, compressive stress is planted into the hub, and the fatigue life of the disk forgings can be effectively prolonged.

Specifically, according to the method provided by the present application, pre-spinning can be performed at a high-speed spinning platform so that the whole disk forgings are subjected to yielding, resulting in micro plastic deformation, thereby regulating the internal internal stress in the disk forgings.

In addition, by regulating the internal stress in the disk forgings, the possibility of part warping and deformation during subsequent machining is avoided, facilitating the improvement of the machining efficiency and dimension precision.

In addition, because the disk forgings without obvious stress concentration is adopted for pre-spinning, in order to achieve yielding of the whole disk, the internal stress is regulated under a revolution of the pre-spinning much higher than the revolution in service. Therefore, in subsequent overspeed strength test, it can be ensured that no harmful deformation exceeding design requirements occurs under 115% or 120% high-stress state. Likewise, harmful deformation will not occur in service so that the dimension control of the parts is facilitated. Moreover, by stopping the pre-spinning, the spinning speed of the disk forgings is decreased, so that a stress distribution of internal pressure and external tension is formed along the radial direction of the disk forgings, which is favorable for working conditions during service (compressive stress is planted in the hub of the disk piece), thereby effectively prolonging the fatigue life of the disk forgings.

Compared with the traditional method for decreasing the internal internal stress in the disk forgings merely by controlling the cooling speed of the heat treatment, the present method can not only solve the problem of machining deformation, but also ensure that no more harmful deformation exceeding a designed deformation occurs in the overspeed strength test state and in subsequent service life because the internal stress is regulated in advance.

In the present application, the target revolution for regulating the internal stress in the disk forgings can be determined according to an appropriate manner, for example, a simulation. According to a preferred embodiment of the present application, the target revolution can be obtained by performing correction according to the simulation result. Specifically, Step S1 includes: Step S11, obtaining a predicted revolution for regulating the internal stress in the disk forgings by simulated calculation; Step S12, performing the pre-spinning of the disk forgings by the predicted revolution, and monitoring the deformation magnitude of the disk forgings; and Step S13, adjusting the predicted revolution according to a monitored deformation magnitude of the disk forgings to determine the target revolution.

In other words, in the preferred implementation of the present application, the predicted revolution is firstly determined in Step S11, then pre-spinning is performed by the predicted revolution in Step S12, and finally, the revolution is adjusted in Step S13 according to the deformation magnitude of the disk forgings to correct the predicted revolution and obtain the target revolution. After the target revolution is determined by the disk forgings, a disk forgings having the same specification and state as those of the disk forgings can be pre-spun by the determined target revolution.

In Step S11, in order to obtain the predicted revolution, the internal stress in the disk forgings can be obtained by simulated calculation, and the target internal stress to be regulated can be set as required. In particular, when regulating the internal stress, it is necessary to control the deformation magnitude of micro plastic deformation in order to maintain the mechanical properties of disk forgings. To this end, Step S11 may include: Step S111, simulating heat treatment of the disk forgings to obtain a internal stress distribution of the disk forgings; and Step S112, simulating the pre-spinning of the disk forgings by different revolutions to determine the predicted revolution; in which the pre-spinning by the predicted revolution enables the internal stress in the disk forgings to be regulated to be 400 MPa or below and enables the deformation magnitude of the disk forgings to be 0.05%-1.95%.

In particular, in order to obtain a more precise internal stress distribution of the disk forgings, the simulation result can be corrected by the actually detected internal stress distribution of the disk forgings. Specifically, Step S111 may include: obtaining the internal stress distribution by detecting an actual internal stress in the disk forgings, and correcting a simulation result of the disk forgings by using the actual internal stress.

Those skilled in the art will appreciate that the heat treatment and pre-spinning of the disk forgings can be simulated in a variety of appropriate manners. For example, the material, dimension, and heat treatment process of the disk forgings can be set, and finite element simulation (e.g., using ansys software) can be performed to simulate the heat treatment of the disk forgings. For example, the heat treatment can be simulated with reference to "Progresses in Research of Numerical Simulation of Heat treatment on Steel" (*Journal of Tianjin University of Technology and Education*, Vol. 24, No. 3, September 2014). Correspondingly, the pre-spinning of the disk forgings can be simulated by increasing spinning movements according to parameters such as the revolution of the pre-spinning and the like.

Figure 3A:
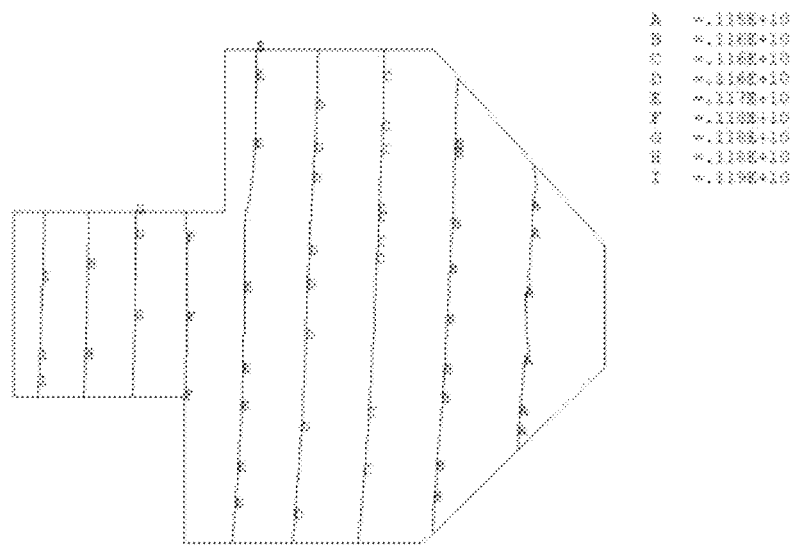
Figure 3B:
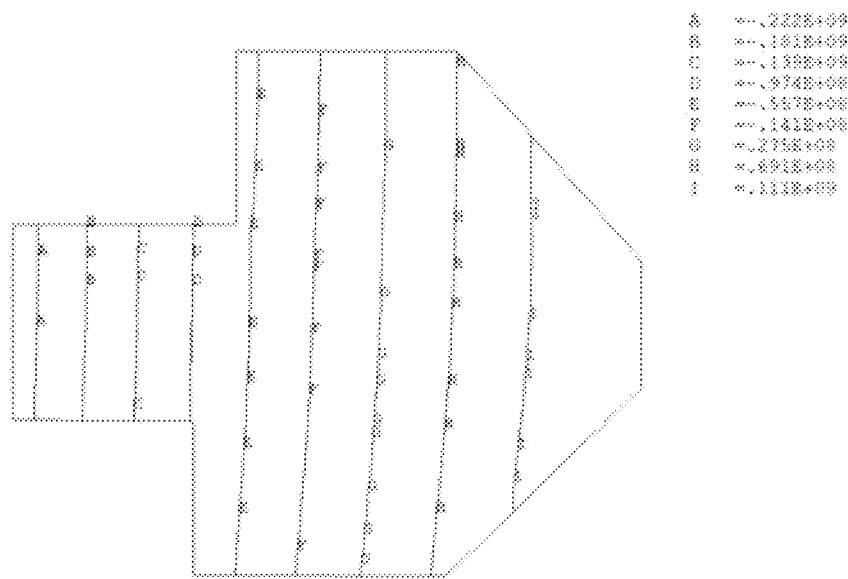
Figure 3C:
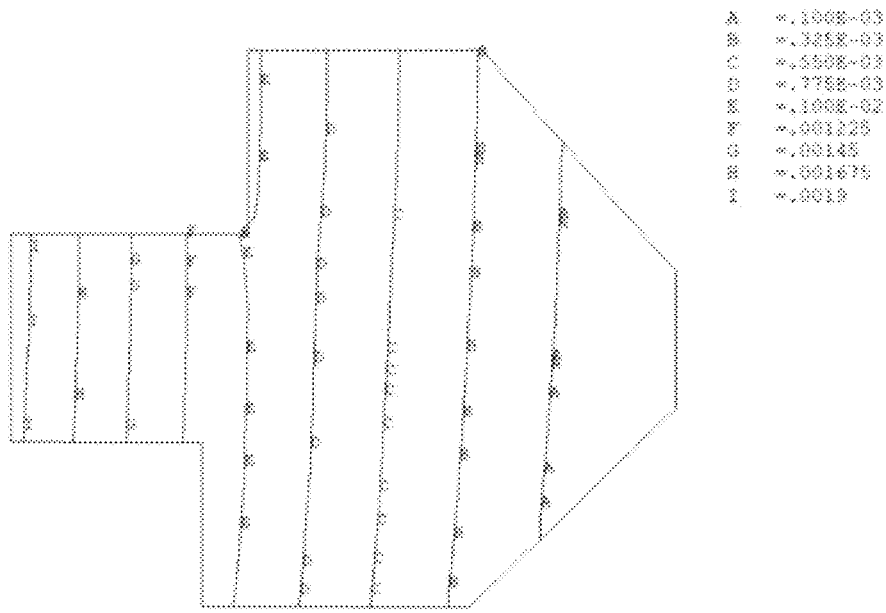
Figure 3D:
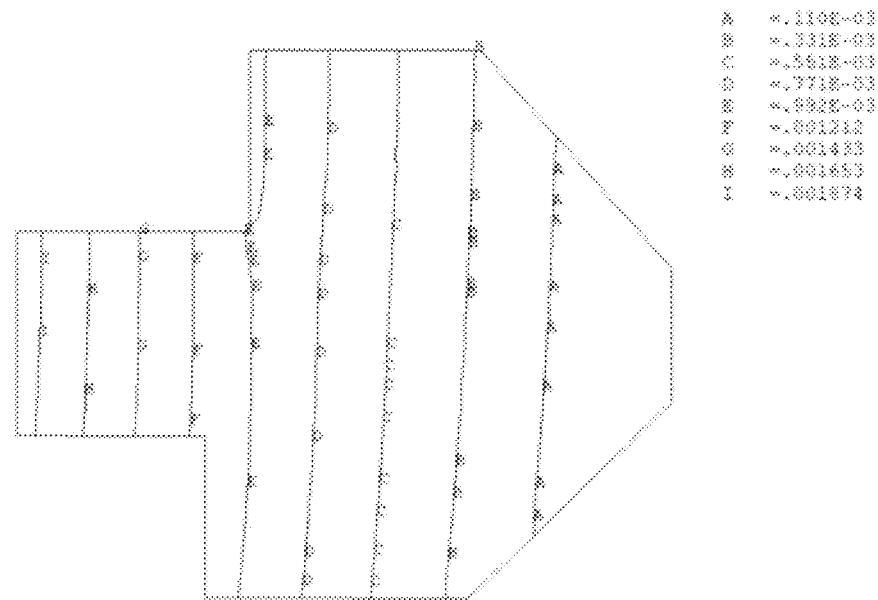
Figure 4A:
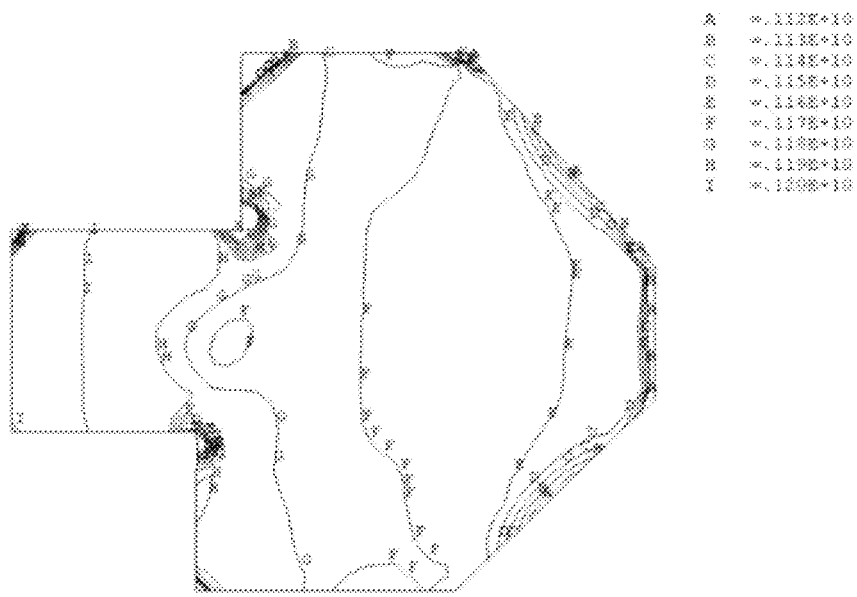
Figure 4B:
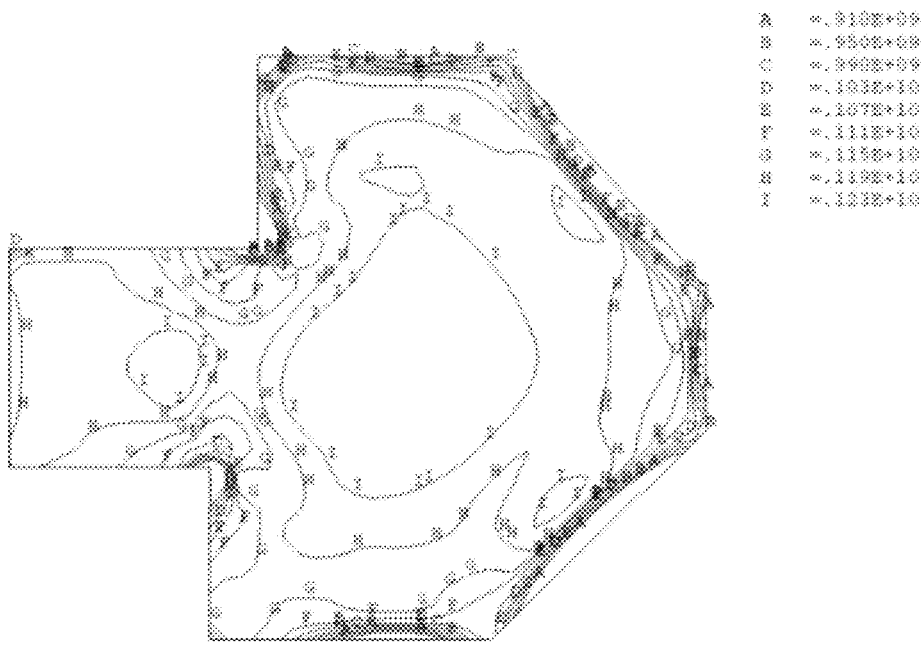
Figure 4C:
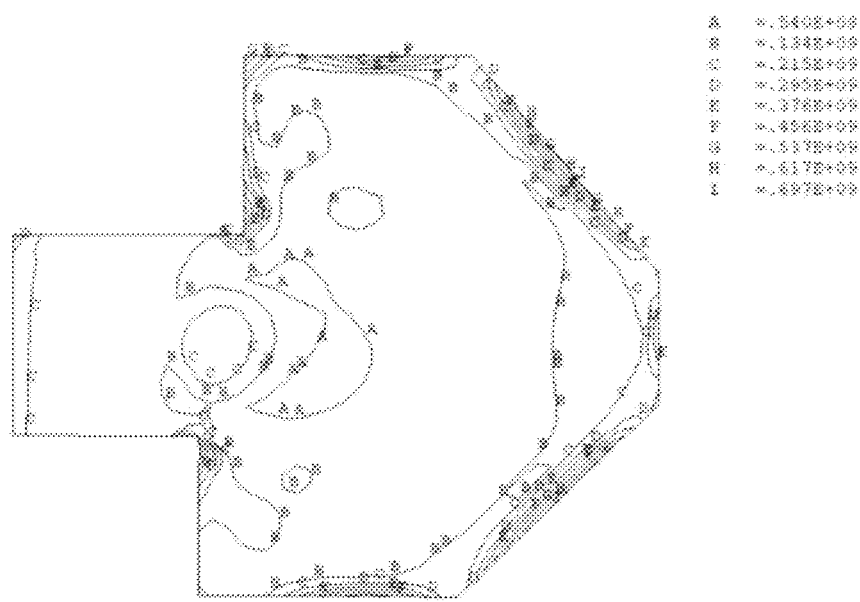
Figure 4D:
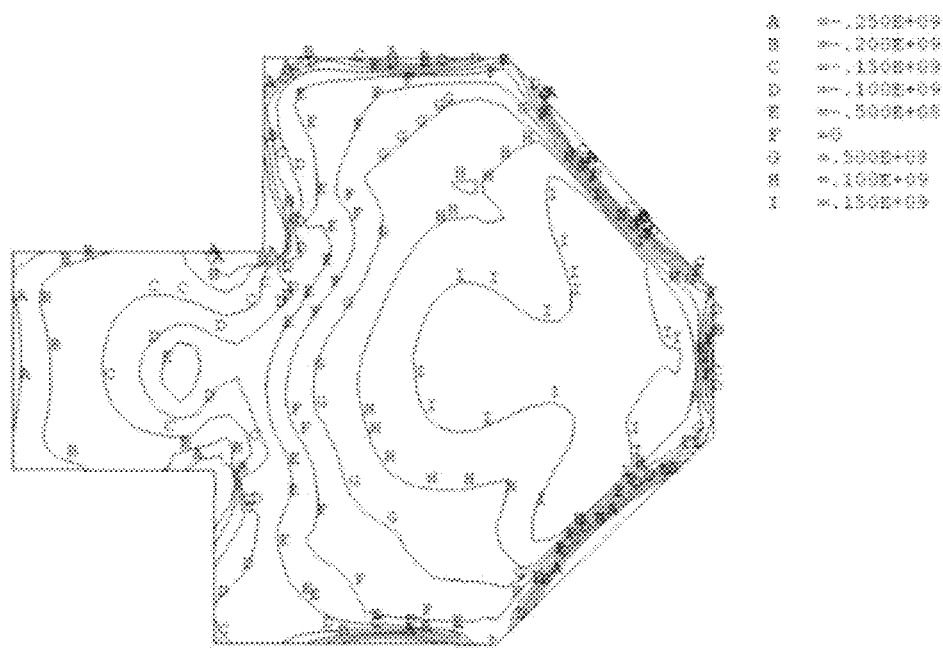
Figure 4E:
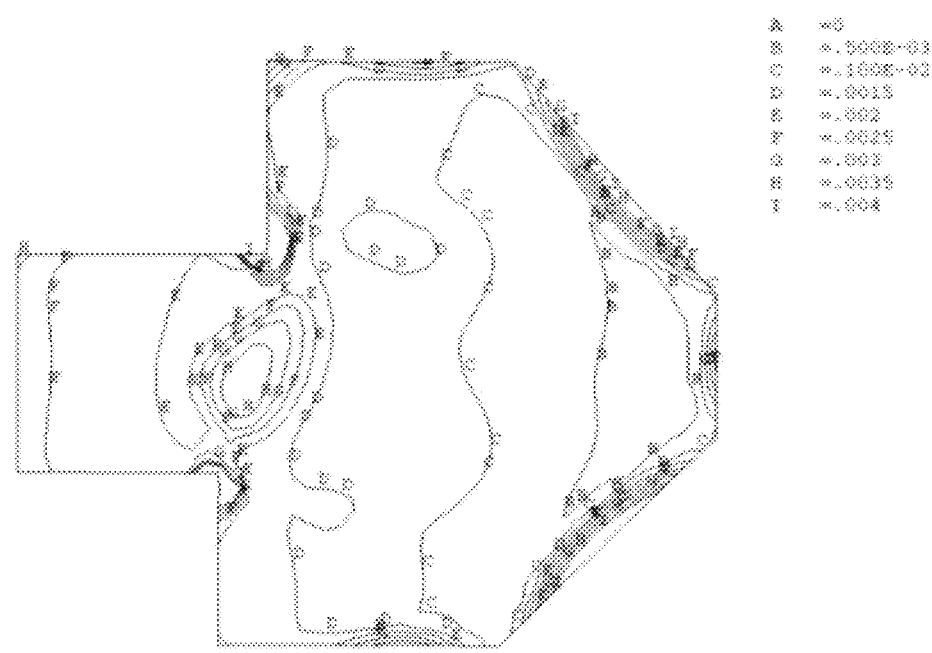
Figure 4F:
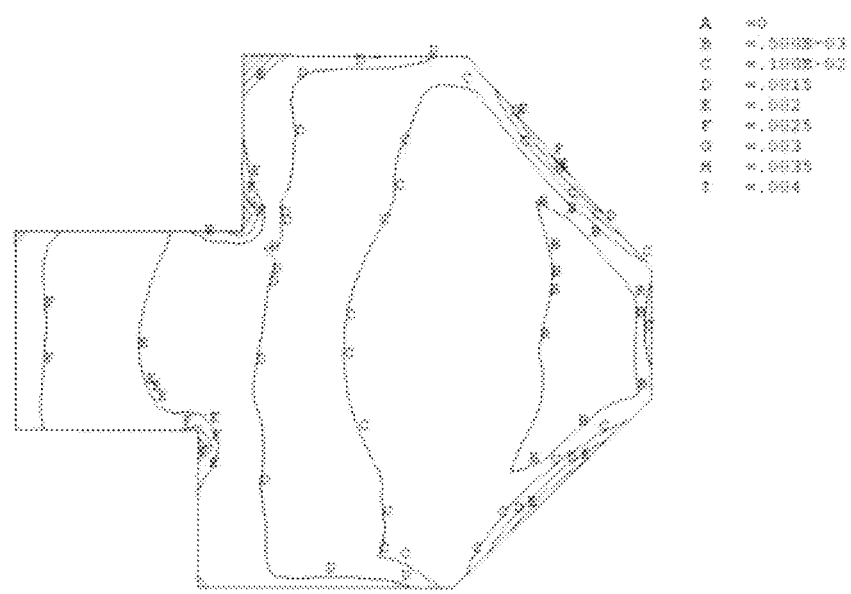

Under a condition not taking initial heat treatment stress ($\sigma_{initial}=0$) into consideration, in the whole process of simulating the pre-spinning treatment and after stopping the spinning when the treatment is completed, the stress-strain values at individual positions on the disk forgings are generally a function of the diameter of the disk forgings, independent of the specific geometric dimension feature of the cross section of the disk forgings, as shown in FIGS. 3A-3d. When the pre-spinning reaches a maximum spinning speed, as shown in FIG. 3a, the yield point has been reached in the region between the inner diameter $D_{inner}$ and the contour line numbered A (the yield strength of the material at room temperature is set to 1150 MPa). In the process of increasing the revolution, the plastic deformation firstly starts from the inner diameter $D_{inner}$ of the disk forgings and gradually expands outwards radially. Accordingly, by precisely controlling the maximum spinning speed of the pre-spinning, the range in which the yield point is reached on the disk forgings can be precisely controlled, and the specific plastic deformation magnitude can be acquired. As can be seen from FIGS. 3c and 3d, for a low scroll with $(D_{outer}-D_{inner})/D_{inner} \ll 1$, the plastic deformation magnitude of the disk forgings from the inner diameter $D_{inner}$ to the outer diameter $D_{outer}$, i.e. an overall plastic deformation magnitude of the disk forgings, can be controlled within a small range of 0.05%-0.25%.

Figure 5A:
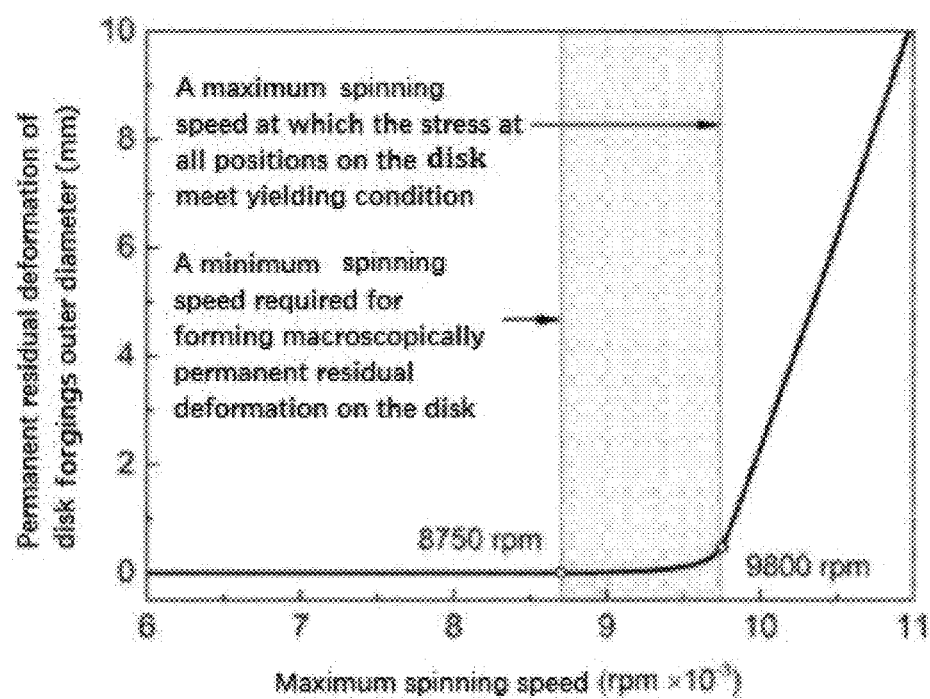
Figure 5B:
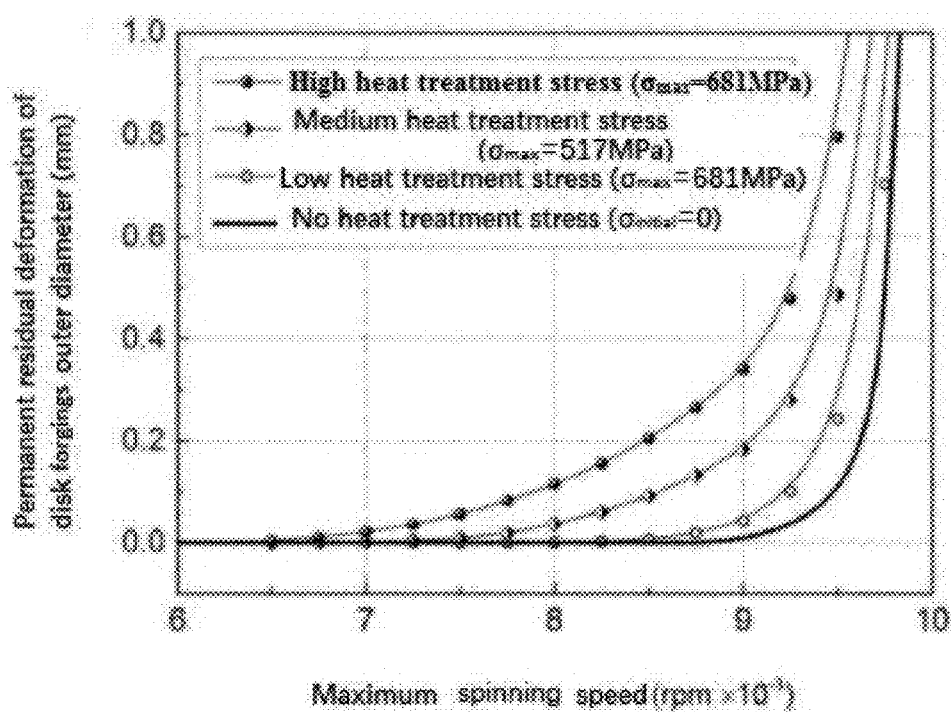
Figure 5C:
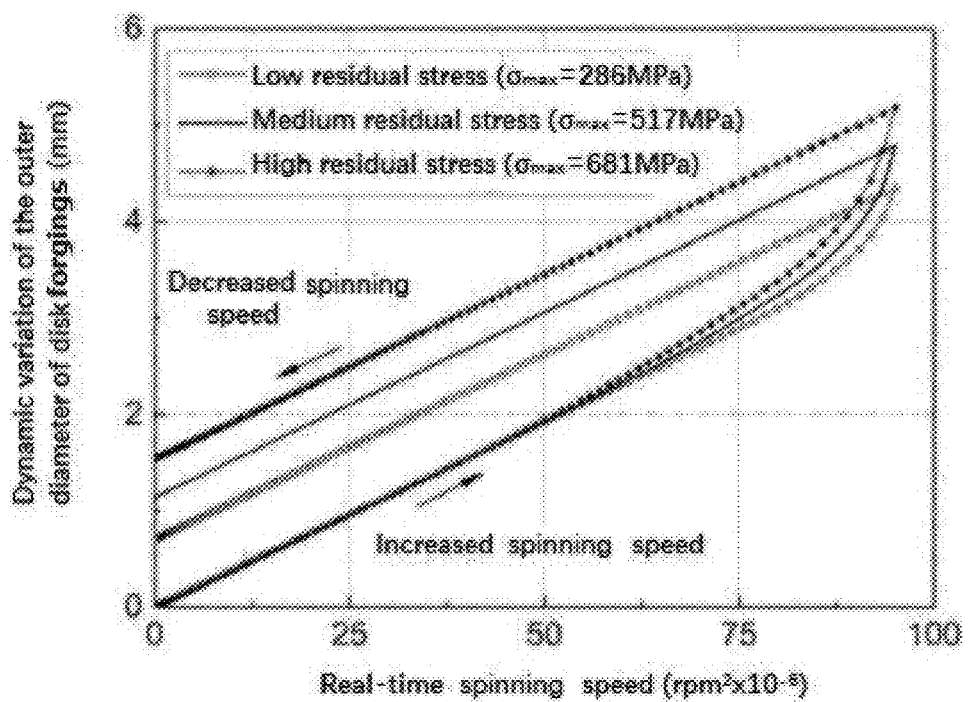
Figure 5D:
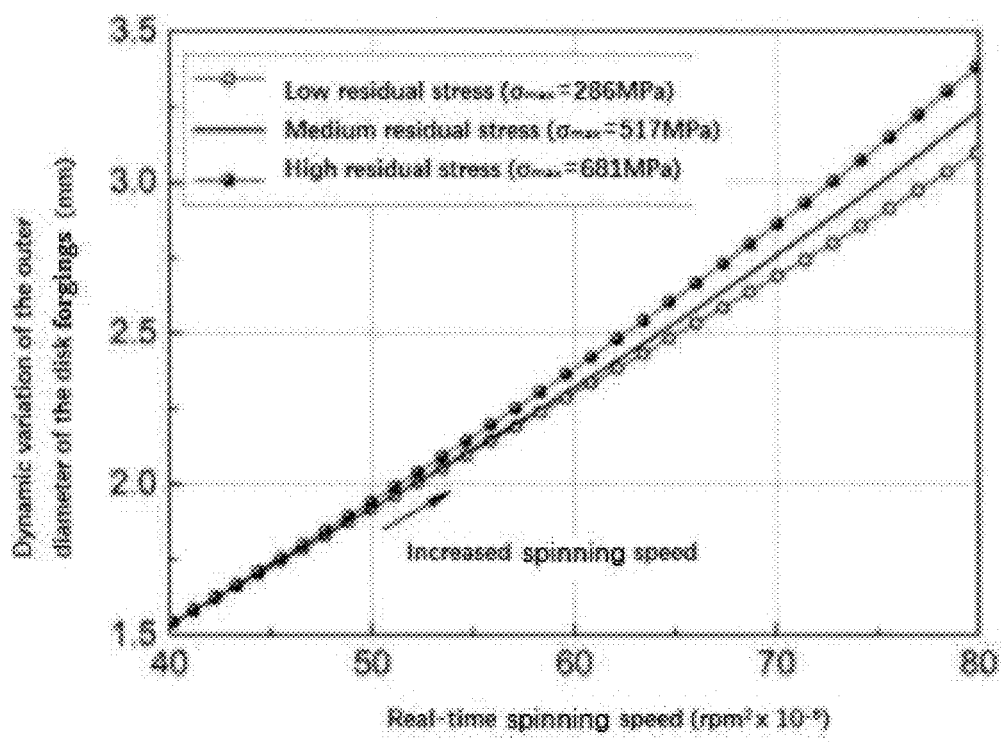

FIGS. 4a to 4f show the results of pre-spinning simulation in the presence of heat treatment stress (i.e. an actual state of the disk forgings). By comparison, it can be seen that, in the presence of heat treatment internal stress, the stress distribution and deformation behavior of the disk forgings during pre-spinning are greatly different from those in an ideal state without initial stress given in FIGS. 3a to 3d. The reason lies in that, due to the presence of the internal stress of the initial heat treatment, the initial chordwise tensile stress is superimposed with a pre-spinning centrifugal force at a position where the tensile stress is formed inside the disk forgings, so that the critical pre-spinning speed required for the corresponding region to reach the yield point is much lower than that for a situation where there is no initial stress, as shown in FIG. 5b. The greater the initial chordwise tensile stress introduced by heat treatment is, the lower the critical spinning speed required by the disk forgings for reaching the yield point during the pre-spinning is. In addition, a position on the disk forgings which reaches the yield point at the earliest time is no longer at the inner diameter $D_{inner}$, but at the position with an initial maximum tensile stress formed in the inner region of the cross section due to heat treatment. As the spinning speed increases, the range in which the yield point is reached gradually expands from the position with maximum tensile stress to adjacent regions. Under a constant maximum spinning speed, with the increase of the heat treatment internal stress, the change in the outer diameter of the disk forgings after spinning treatment is increased. The reason lies in that, the more the heat treatment stress as regulated as a whole is, the more the elastic deformation magnitude of individual positions in the disk forgings recovered due to the loss of stress constraint is. Specifically, along with the heat treatment stress of the disk forgings, the tensile stress in the tensile stress region is regulated by generating local plastic deformation, and the compressive stress region which is in a balanced state with the tensile stress region due to mutual constraint can be synchronously and elastically stretched due to the loss of the constraint, macroscopic manifestation of which is that, the higher the internal stress of the heat treatment is, the larger a permanent increase in the value of the outer diameter $D_{outer}$ of the disk forgings after pre-spinning treatment is. FIG. 5c shows the dynamic variation of the outer diameter $D_{outer}$ of the disk forgings vs. the spinning speed during the whole process of loading and unloading in pre-spinning by a maximum spinning speed of 9750 rotations permin. For one specific pre-spinning, the disk forgings is directly proportional to the square of the spinning speed in the elastic deformation stage. Comparing FIG. 5c with FIG. 5d, it can be seen that the increasing speed of the outer diameter of the disk forgings is accelerated after the yielding starts, however, in the unloading stage after reaching the maximum spinning speed, the outer diameter of the disk forgings remains a linear relationship with the square of the spinning speed. With the increase of the heat treatment internal stress, under the same pre-spinning condition, the initial yielding time of disk forgings becomes earlier, and the permanent deformation magnitude of the outer diameter after unloading becomes larger. In particular, FIG. 5d, which is a partially enlarged view of the spinning speed increasing stage in FIG. 5c, shows that the magnitude of the heat treatment internal stress has a significant influence on the deformation behavior of the disk forgings at the early stage of the spinning speed increase.

Figure 1B:
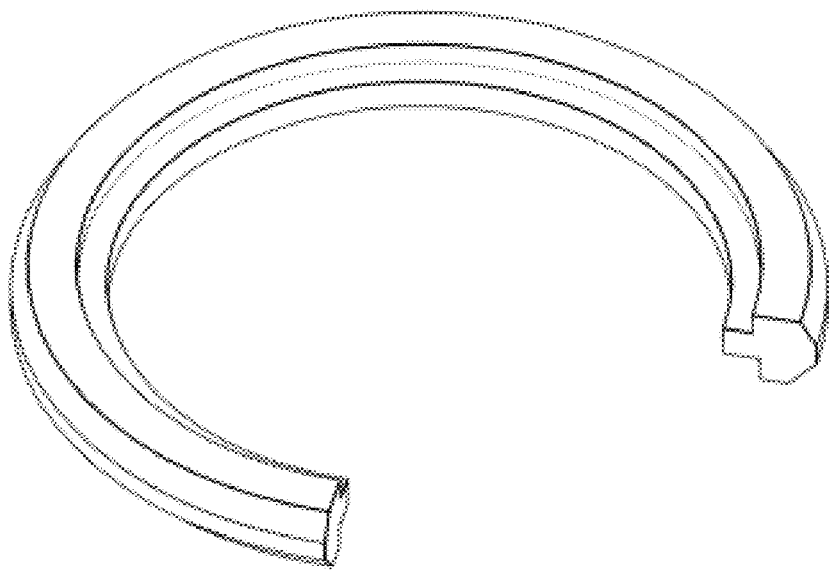
FIG. 1b is a schematic structural diagram in which disk forgings is an annular disk (for the purpose of showing a cross section, FIG. 1a and FIG. 1b are views with a portion removed, and the disk forgings are of a complete annular shape)

When the disk forgings is of the low scroll structure as shown in FIG. 1b, in which the disk forgings has a dimension feature that the diameter $D_{inner}$ of an inner hole is close to the diameter $D_{outer}$ of an outer circle and both of them are relatively large, namely $(D_{outer}-D_{inner})/D_{inner} \ll 1$, individual gradients of the stress-strain amounts formed on the cross section of the disk forgings by the pre-spinning are relatively small, and the overall distribution is relatively even. Such a feature of a low scroll configuration makes it possible to realize complete yielding of the disk forgings and acquire a trace amount of permanent plastic deformation by the technology of pre-spinning the disk forgings, by which the internal stress distribution state of "internal pressure and external tension" caused by heat treatment can be completely reconstructed. In fact, all the configurations of turning pieces with annular features like the low scroll are suitable for regulating the stress distribution state of the disk forgings by adopting a pre-spinning method. Compared with parts such as a low scroll, a labyrinth disk, and a baffle or the like having small cross sections, when the disk forgings is of the high scroll structure as shown in FIG. 1a, a higher level of internal stress is often formed in the disk forgings during heat treatment due to features of usually heavy weight of the high scroll and large thickness at a site such as a hub or the like. The overall structural features of the high scroll part are that the outer contour is relatively thick and large and the structure has high rigidity, therefore, the problem of affecting the dimension of the parts by the heat treatment internal stress in the machining process is often not as serious as that in other thin-wall disk pieces.

However, during the procedure of over-spinning test and service on a machine, if the tensile stress in the heat treatment internal stress is superimposed with a service load, it is possible for a specific position of the disk forgings to reach the yield point within the spinning speed range much lower than the nominal load. In the working process of the disk forgings, once a local yielding phenomenon occurs in the residual tension region, the overall regulation of the internal stress of the heat treatment will be resulted in, which is manifested as harmful deformation in macroscopic dimension of the disk forgings beyond expectation. In fact, excessive heat treatment internal stress is one of the leading reasons for the loss of dimensional stability for a high scroll in service under a working condition with a strength much lower than a designed strength.

The difference between the inner diameter and the outer diameter of the high scroll is large, namely $(D_{outer}-D_{inner})/D_{inner} \ggg 1$. Therefore, if a spinning speed for yielding the whole of the high scroll is adopted for pretreatment, the plastic deformation magnitude at the inner diameter position will be too large, negatively influencing the structural performance of the material. However, due to the high heat treatment tensile stress present in a specific region of the hub position of the high scroll, a maximum tensile stress position on the disk forgings reaches the yield point in a low spinning speed range, even at a spinning speed lower than that required for the yielding at the inner hole $D_{inner}$, so that the heat treatment internal stress is effectively regulated.

Figure 9A:
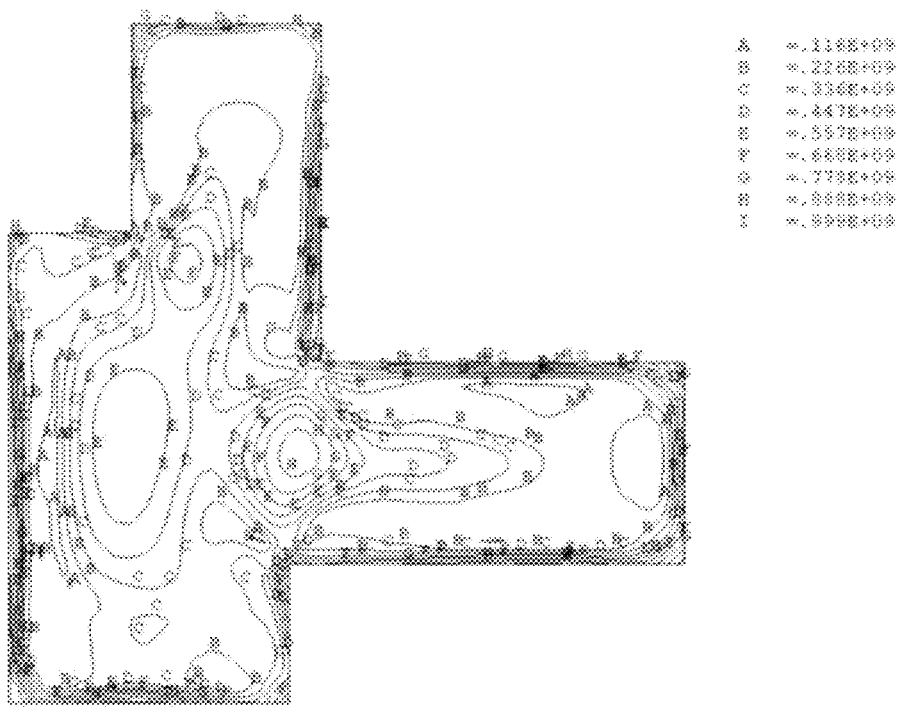
FIG. 9a to FIG. 9d show a regulation effect of the pre-spinning treatment on the stress state of a high scroll according to Example 2 of the present application.
Figure 9B:
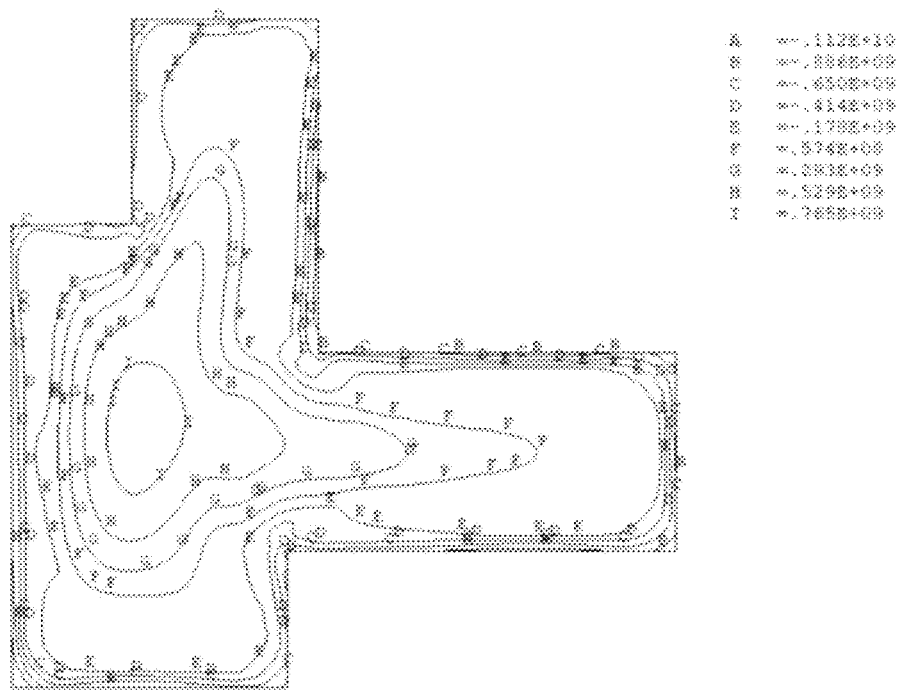

As can be seen from FIGS. 9a and 9b, the heat-treated high scroll has very high internal stress, the maximum tensile stress therein appears in the inner region of the hub, the maximum tensile stress reaches up to 700-900 MPa, and accordingly, the maximum compressive stress on the surface of the disk forgings can reach 1000 MPa or higher. If the yield strength of the material is 1200 MPa at room temperature, the hub position will actually enter a yielding state when the working load at the hub position in service reaches 500 MPa or higher, so that the internal stress on the disk forgings is regulated. At this time, a harmful deformation beyond expectation will be generated in the disk forgings under a working condition with a yield strength much lower than the nominal yield strength.

Different from a pre-spinning of a low stroll which can achieve a yielding for the whole disk forgings, for the purpose of preventing excessive plastic deformation magnitude, a plastic deformation will be usually introduced to the high scroll only at the hub position at the highest pre-spinning speed so as to ensure that the tensile stress of the hub region is sufficiently regulated. The web and the rim region will not be subjected to plastic deformation at all during pre-spinning, therefore, the microstructure states such as dislocation density and the like at the rim position will be not influenced. As such, it is ensured that the yield strength and the fatigue performance of the hub position are improved, and the high-temperature creep endurance performance of the rim position is not attenuated.

Figure 9C:
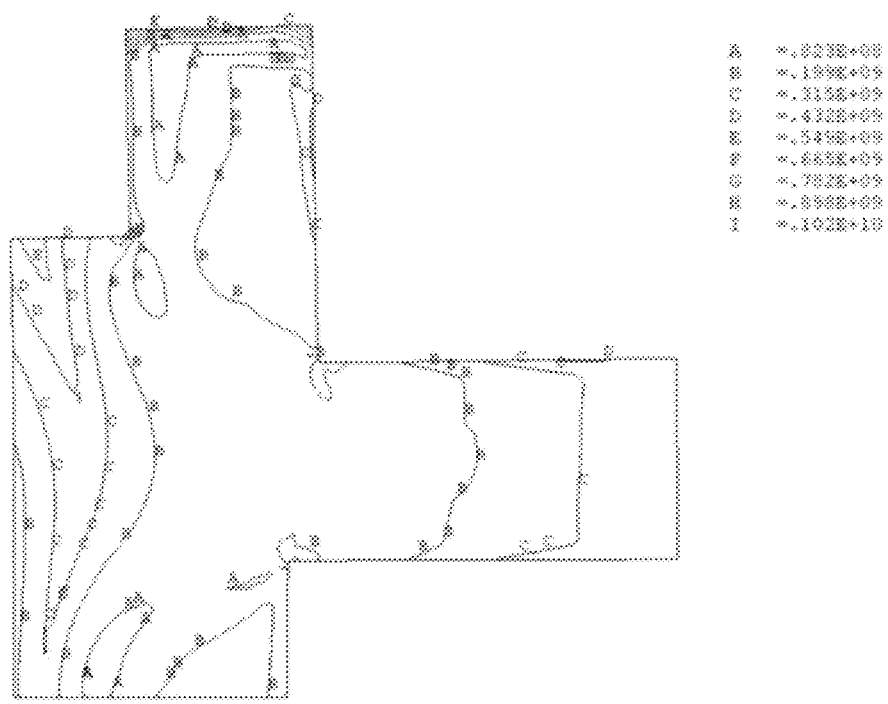
Figure 9D:
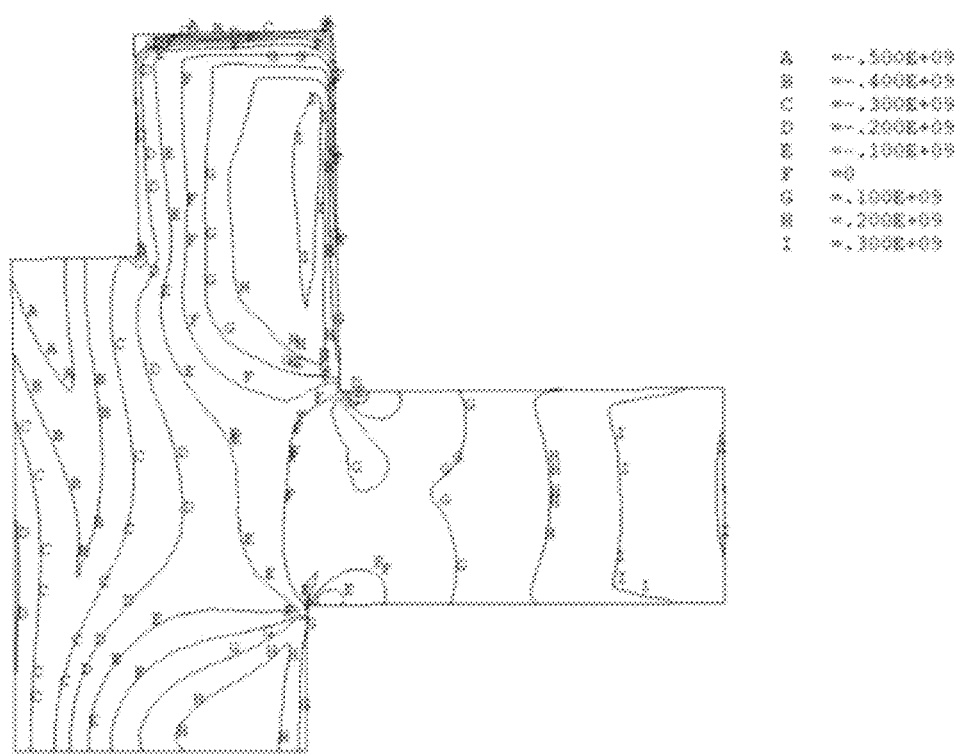

By implementing the pre-spinning, as shown in FIGS. 9c and 9d, the chordwise tensile stress region in the inner region of the hub is substantially eliminated, the heat treatment internal stress in the disk forgings is effectively regulated, and meanwhile, the compressive stress which is distributed in gradients from the inner hole along the diameter direction covers a region corresponding to the web of the disk forgings. The internal stress distribution state adjusted by the pre-spinning, particularly the chordwise compressive stress implanted in the hub region, can significantly improve the fatigue performance of the disk forgings. More importantly, due to the elimination of excessive chordwise tensile stress in the hub, the disk forgings can be prevented from reaching the yield point too early in subsequent service due to the residual tension superposed with a working stress, which otherwise would lead to harmful deformation of the disk forgings due to internal stress regulation. Therefore, the pre-spinning treatment of the disk forgings is an effective stress regulation means, and has very important engineering application value for ensuring dimensional stability of a high scroll in subsequent service life.

In addition, in Step S112, in order to properly set the predicted revolution, the required degree of regulation can be set according to the internal stress distribution obtained by simulation, that is, the internal stress of the pre-spun disk forgings is regulated to be 400 MPa or below. Specifically, different pre-spinning revolutions can be set for simulating the pre-spinning, and a finally determined predicted revolution shall be the one enabling the internal stress of the pre-spun disk forgings to be regulated to be 400 MPa or below. In particular, the predicted revolution determined by the simulated pre-spinning further entails a deformation magnitude of the disk forgings of 0.05%-4.95%, so that the disk forgings is prevented from generating excessive plastic deformation and influencing the mechanical properties of the disk forgings.

In the above Step S13, the revolution of the pre-spinning can be adjusted adaptively according to comparison result between the monitored deformation magnitude of the disk forgings and the target deformation magnitude. Specifically, Step S13 includes: S131 determining the predicted revolution as the target revolution if the monitored deformation magnitude of the disk forgings reaches the target deformation magnitude when performing the pre-spinning of the disk forgings by the predicted revolution; or Step S132, if the monitored deformation magnitude of the disk forgings is lower than the target deformation magnitude when performing the pre-spinning of the disk forgings by the predicted revolution, gradually increasing the revolution of the pre-spinning until the monitored deformation magnitude of the disk forgings reaches the target deformation magnitude when performing the pre-spinning by a final revolution, and determining the final revolution as the target revolution.

Step S131 is applicable to a case where the predicted revolution is relatively precise, i.e., a required target deformation magnitude can be reached by pre-spinning by the predicted revolution. Step S132 is applicable to a case where the predicted revolution is not precise enough (i.e., pre-spun by the predicted revolution can not reach the target deformation magnitude) and the modification is required, in which a specific modification is to gradually increase the revolution of the pre-spinning. In order to precisely determine the target revolution, it is possible to properly set the revolutions increased each time. Preferably, Step S132 includes: gradually increasing the revolution of the pre-spinning by a step of 25-100 rotations per minute if the monitored deformation magnitude of the disk forgings is lower than the target deformation magnitude when performing the pre-spinning of the disk forgings by the predicted revolution.

In addition, in order to avoid the influence of excessive plastic deformation of the disk forgings caused by pre-spinning on mechanical properties, the target deformation magnitude can be properly set such that only slight plastic deformation of the disk forgings occurs, and preferably, the target deformation magnitude is 0.05%-1.95%. When monitoring the deformation magnitude of the disk forgings, the deformation magnitude of a specific position (for example, at the outer diameter) on the disk forgings is often monitored. However, the deformation magnitudes varies at different positions on the overall disk forgings. For example, the deformation magnitude at the inner diameter is larger than that at the outer diameter. Therefore, the range of the deformation magnitude at individual positions shall be guaranteed to be within the range of the target deformation magnitude.

Further, in order to precisely monitor the deformation magnitude of the disk forgings, it is preferable to monitor the deformation magnitude of the disk forgings after keeping the current revolution of the pre-spinning for at least 30 seconds so as to ensure that the monitoring is performed while the plastic deformation generated by the pre-spinning has been stabilized.

In addition, during the plastic deformation of the disk forgings due to pre-spinning, the disk forgings is subject to a change from elastic deformation to plastic deformation, therefore, the deformation magnitude of the disk forgings will be continuously changed until reaching a stable value. In order to precisely monitor the deformation magnitude, preferably, when monitoring the deformation magnitude of the disk forgings, a stable value is taken as the monitored deformation magnitude of the disk forgings. In particular, when the monitored deformation magnitude fluctuates in the range of ±0.01 mm within 15 s, it could be considered that a stable value is reached.

According to the method of the present application, in order to finally form a stress distribution state of internal pressure and external tension beneficial to a working condition during service along the radial direction of the disk forgings, Step S2 includes: gradually decreasing the revolution of the pre-spinning to zero when it is monitored that the deformation magnitude of the disk forgings reaches the target deformation magnitude. Specifically, the revolution may be gradually decreased by 1-200 rotations per second until the pre-spinning stops.

The method of the present application is applicable to various superalloy disk forgings with high internal stress. In particular, the superalloy includes a wrought superalloy, a powder superalloy, or a cast superalloy.

In addition, in order to verify the effect of the method provided by the present application, step S3 is included: drawing a internal stress distribution diagram of the disk forgings after pre-spinning. By drawing a internal stress distribution diagram after pre-spinning, the technical effect of the present application can be more visually seen. In particular, the internal stress distribution diagram after pre-spinning can be drawn in a variety of suitable manners, for example drawing by simulation. To improve the efficiency, preferably, step S3 includes: S31, simulating the pre-spinning of the disk forgings by the target revolution to obtain the internal stress distribution of the disk forgings after the pre-spinning; and S32, detecting the actual internal stress at a feature site of the disk forgings (for example, a position with small fluctuation of the stress distribution selected according to a simulated result), and correcting the simulated result of the disk forgings after pre-spinning by using the actual internal stress so as to obtain the internal stress distribution of the disk forgings after pre-spinning.

In the present application, the actual internal stress of the feature position of the disk forgings can be detected in an appropriate manner. For example, 0.2 mm or more below the surface of the feature site of the disk forgings can be measured by an X-ray diffraction method.

In order to ensure the final effect, the disk forgings applicable to the present application is a disk structure without obvious stress concentration before pre-spinning, including, but not being limited to, annular disk forgings, compressor disk forgings, turbine disk forgings and the like. Further, the pre-spinning operating temperature suitable for the present application is -50° C.-750° C., in particular, room temperature. Particular operating temperature depends primarily on the ratio of the tensile strength of the material to the yield strength of the material.

In the present application, various suitable high-speed spinning equipment can be adopted for pre-spinning as long as the conditions of spinning speed control, temperature, and the like required by pre-spinning the disk forgings can be met. The deformation magnitude in the pre-spinning process can be monitored by using suitable equipment, for example, by infrared displacement detection.

The method of the present application will be illustrated by the following Examples.

Example 1

An annular low-pressure turbine disk forgings of GH4065 alloy was used, and the structure thereof was as shown in FIG. 1b. The inner diameter was Φ618 mm, the outer diameter was Φ829 mm, the height was 85 mm, and the weight was 130 kg. After standard heat treatment, the chordwise internal stress in the disk forgings was the main stress. The X-ray diffraction method was adopted to detect 0.2 mm or more below the feature site. The chordwise internal stress at the hub was -384 MPa, the chordwise internal stress at the web was -641 MPa, and the chordwise internal stress at the rim was -740 MPa, showing a high-stress level.

Figure 2A:
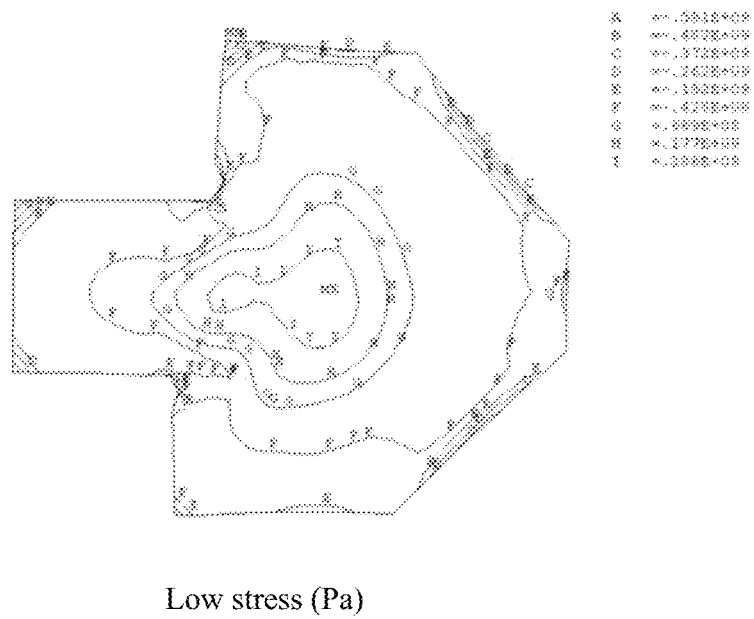
Figure 2B:
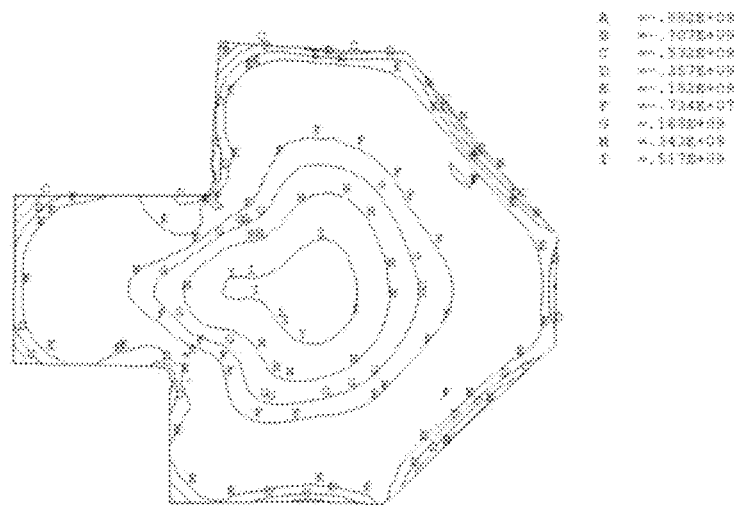
Figure 2C:
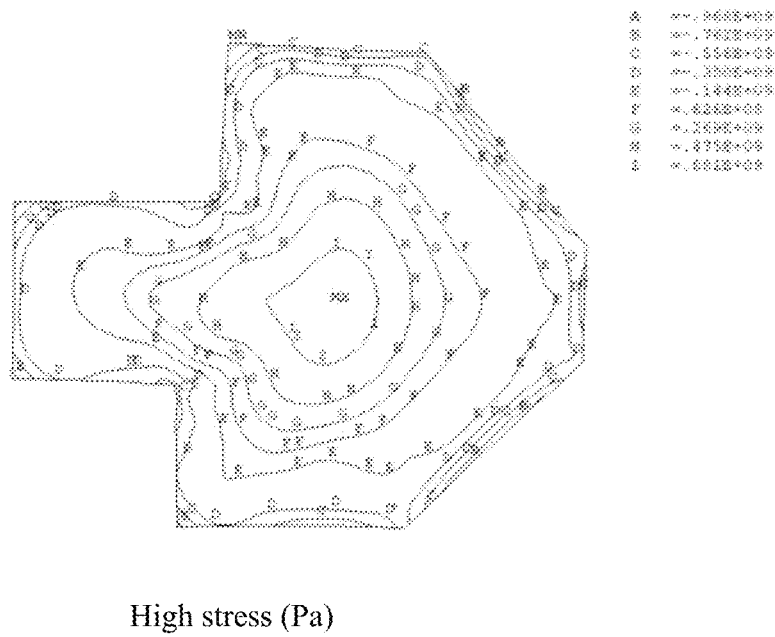

The internal stress distribution of the disk forgings was obtained by simulating the heat treatment of the disk forgings, and as shown in FIG. 2c, the simulated result was consistent with the detection result.

The pre-spinning was then simulated. For a low scroll with $(D_{outer}-D_{inner})/D_{inner} \ll 1$, the plastic deformation magnitude of the disk forgings from the inner diameter $D_{inner}$ to the outer diameter $D_{outer}$, i.e. the overall plastic deformation magnitude of the disk forgings, was controlled within a small range of 0.05%-0.25%.

As shown in FIGS. 4a to 4f, the stress-strain distribution of the disk forgings during the pre-spinning by different revolutions in the presence of heat treatment stress was simulated, the maximum chordwise tensile stress in the disk forgings was regulated to be 400 MPa or below, and the predicted revolution corresponding to an overall deformation of 0.15%-0.25% is 9400 rotations per minute.

Figure 6:
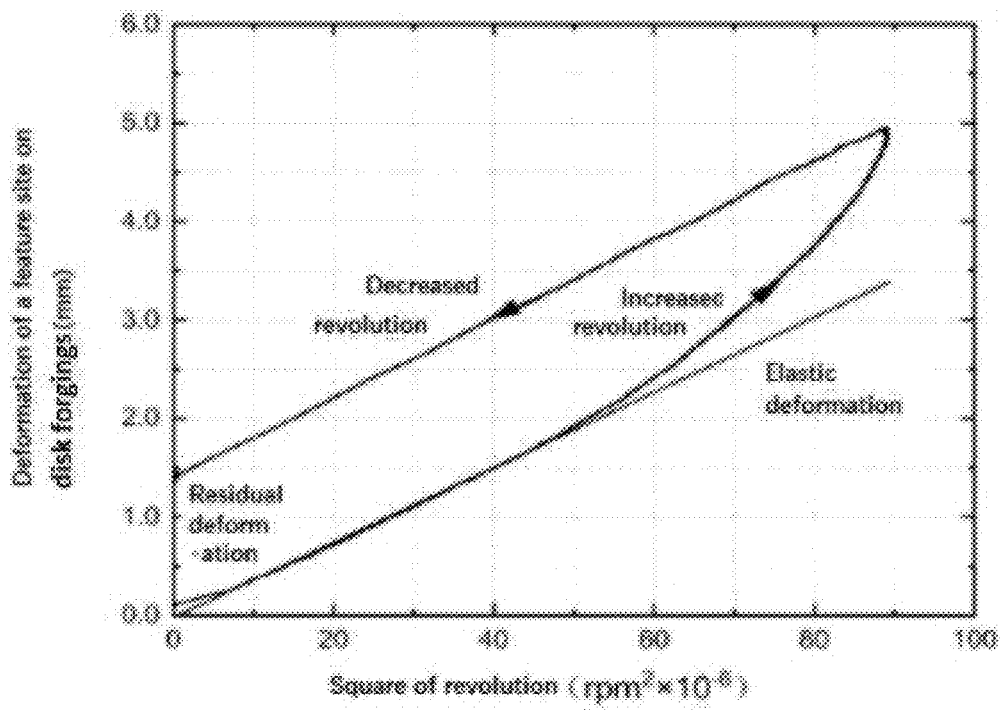
FIG. 6 shows a stress release curve during pre-spinning according to Example 1 of the present application.

The pre-spinning was performed on the disk forgings at 9400 rotations per minute for 60 seconds. As shown in FIG. 6, the deformation magnitude of the disk forgings was monitored, the residual deformation at the outer diameter was detected to be 0.75 mm, and the overall deformation magnitude corresponding to the disk forgings is 0.18-0.24%, reaching the target deformation magnitude, therefore, the predicted revolution was determined as the target revolution. The internal stress can be regulated by the pre-spinning of 9400 rotations per minute for a batch of disk forgings with the same specification.

Figure 7:
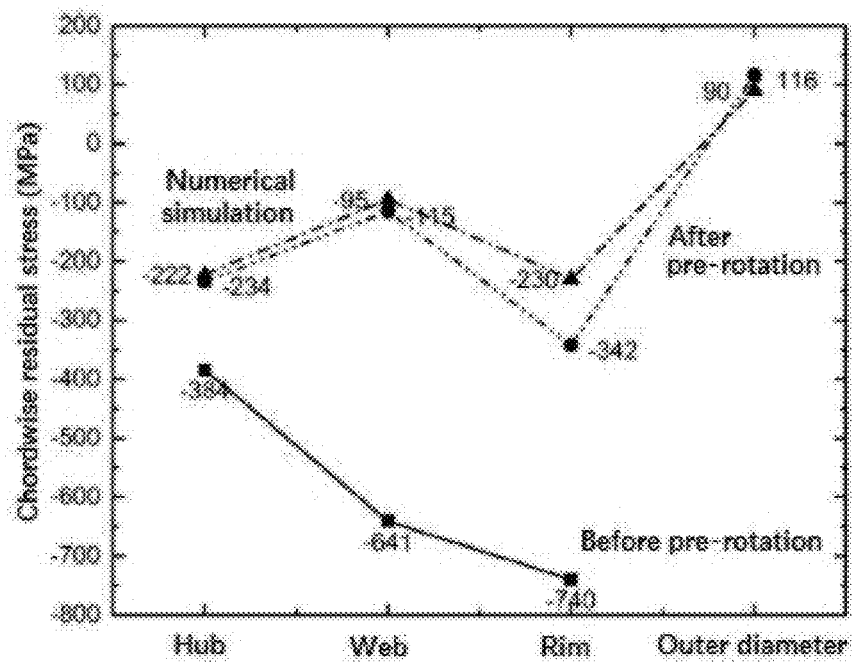
FIG. 7 shows a internal stress result obtained by simulating pre-spinning by a predicted revolution before and after pre-spinning according to Example 1 of the present application.

In order to verify the effect of the present application, the X-ray diffraction method was adopted to measure internal stress (the result was shown in FIG. 7) 0.2 mm or more below the surface of a feature site (for example, a region with small fluctuation of stress distribution selected according to a simulated result) of the disk forgings before and after the pre-spinning. The test result was substantially consistent with the simulated result. Finally, the internal stress distribution diagram after the pre-spinning was drawn, ready for a subsequent disk piece machining process.

Figure 8A:
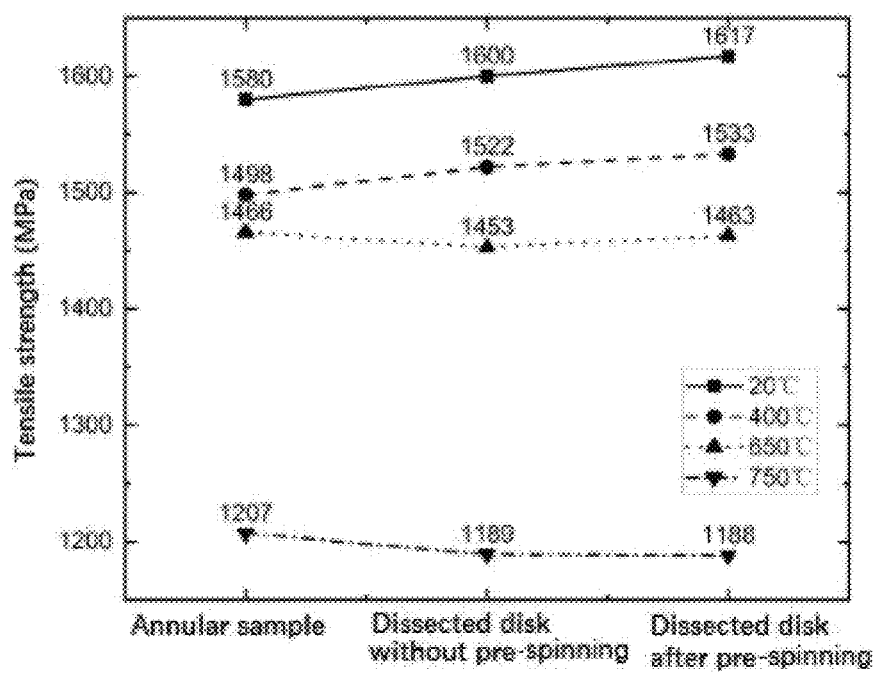
FIG. 8a and FIG. 8b show a change in mechanical properties before and after pre-spinning according to Example 1 of the present application.
Figure 8B:
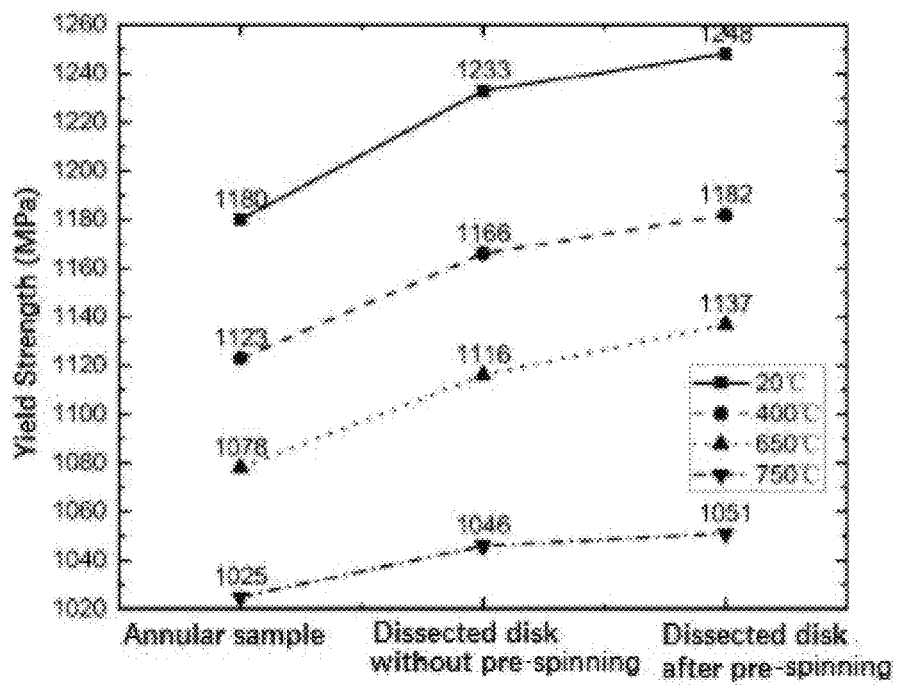

No abnormality was found in the pre-spun disk forgings by ultrasonic inspection. Further dissection was carried out on the disk piece, showing that the microstructure of the disk piece and mechanical properties at various positions (results shown in FIGS. 8a and 8b) were not significantly different from those of a disk piece without subjecting to the pre-spinning.

Example 2

A typical alloy turbine disk forgings of powder superalloy FGH96 (hereinafter also referred to as a high scroll) was treated using the method of Example 1. The structure was shown in FIG. 1a, with an inner diameter of Φ125 mm, an outer diameter of Φ550 mm, a hub height of 215 mm, and a rim height of 60 mm. The disk forgings was subjected to standard heat treatment. The internal stress distribution of the disk forgings was obtained by simulating the heat treatment of the disk forgings. The result was shown in FIGS. 9a and 9b, in which the maximum chordwise tensile stress in the disk piece reached above 700 MPa, which was relatively high.

The pre-spinning of the disk forgings by different revolutions was simulated, the maximum chordwise tensile stress in the disk forgings was reduced to 400 MPa or below, and the predicted revolution corresponding to the overall deformation of 0.15-1.0% was 23500 rotations per minute.

The test piece of the disk forgings was pre-spun at 23500 rotations per minute for 60 seconds. The deformation magnitude of the test piece was monitored. The residual deformation was measured to be 0.70 mm, and the corresponding deformation magnitude was 0.12-0.88%, therefore, the target deformation magnitude cannot be reached. The revolution was increased by 50 rotations each time. When a final revolution was 23550 rotations per minute, the residual deformation reached 0.82 mm, reaching a target deformation magnitude of 0.15-0.98%, therefore, the final revolution was determined as the target revolution. The internal stress can be regulated by the pre-spinning of 23550 rotations per minute for a batch of disk pieces with the same specification.

Figure 10A:
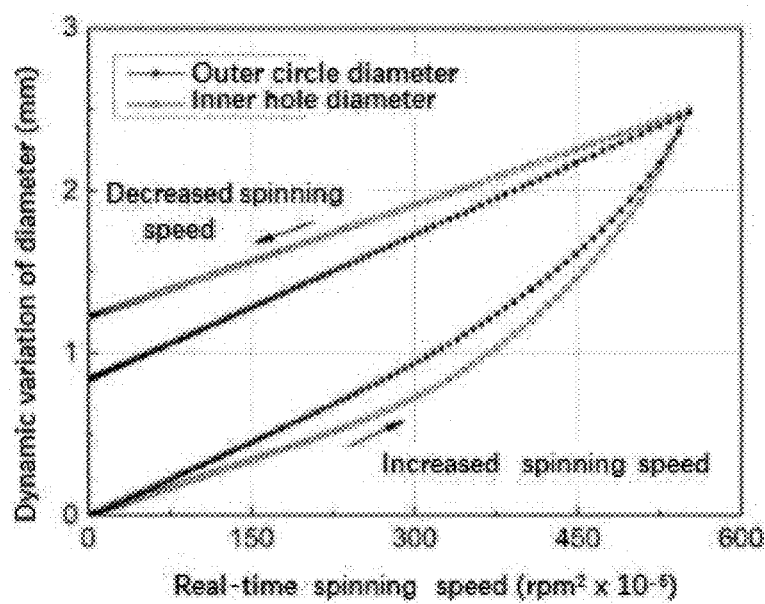
FIG. 10a and FIG. 10b show a stress release curve during pre-spinning and a internal stress result obtained by simulating pre-spinning by a predicted revolution before and after pre-spinning according to Example 2 of the present application.
Figure 10B:
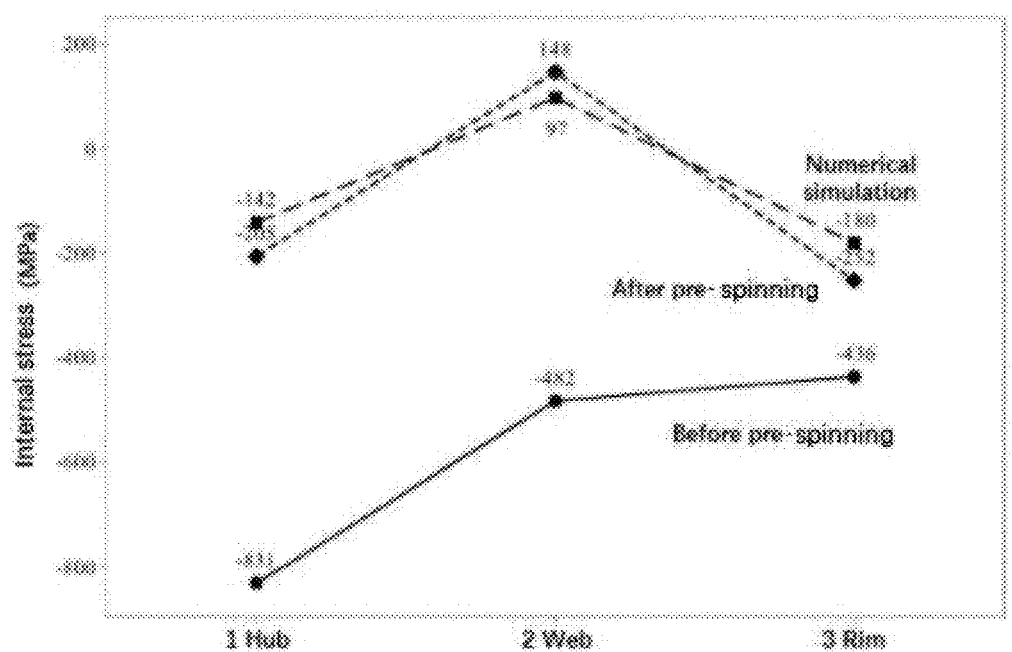

In order to verify the effect of the present application, the internal stress was measured 0.2 mm or more below the surface of a feature site of the disk forgings before and after the pre-spinning (the result was shown in FIG. 10b). The test result was consistent with the simulated result. By ultrasonic inspection to the pre-spun disk piece and an overall dissection performance test to the disk forgings, no significant change was found.

Figure 10C:
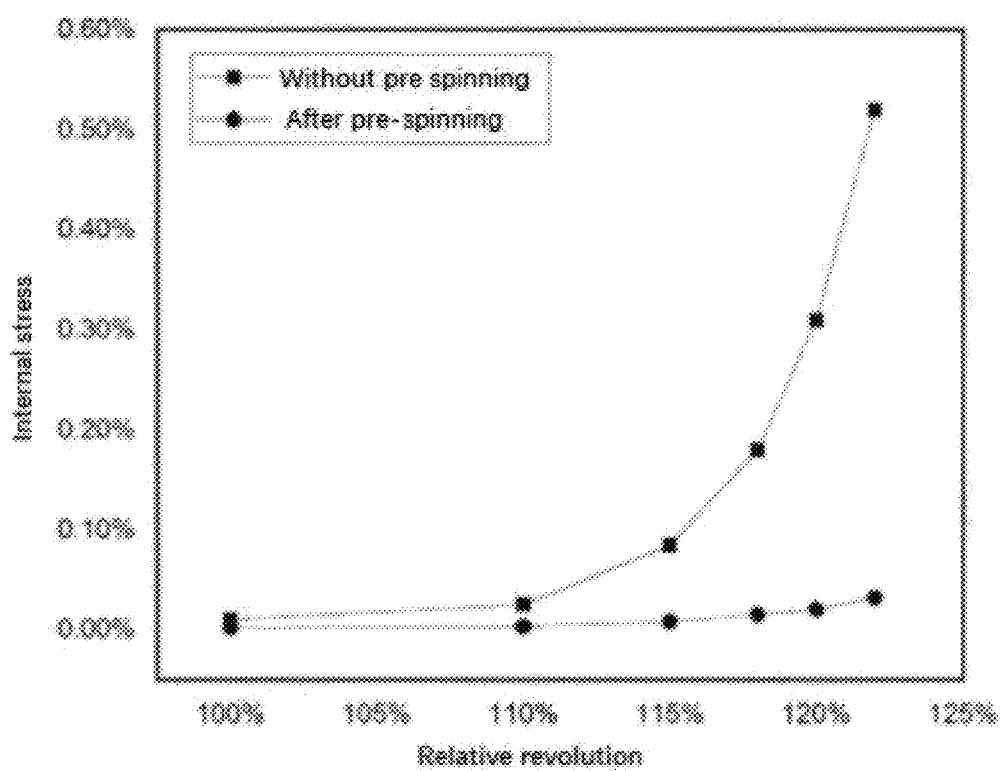
FIG. 10c shows the dimensional change in Example 2 during an overspeed spinning test.

In addition, in order to verify the effect of the present application in terms of dimensional stability, an overspeed test was performed for the pre-spun piece and the non-pre-spun piece. The test result was shown in FIG. 10c. The dimension of the pre-spun disk piece was substantially unchanged in 122% overspeed test.

The preferred implementation modes of the present application are described in detail above with reference to the accompanying drawings, but the present application is not limited thereto. Many simple variations of the technical scheme of the present application are possible within the scope of the technical idea of the present application. The present application includes the combination of various specific technical features in any suitable manner. In order to avoid unnecessary repetition, the present application will not be further described with respect to various possible combinations. However, such simple variations and combinations should also be considered as the disclosed content of the present application, falling within the scope of the present application.

The invention claimed is:

1. A method for internal stress regulation in superalloy disks made by powder metallurgy, casting or forging by pre-spinning, comprising:
Step S1: determining a target revolution rate for regulating internal stress in the superalloy disks, and determining a target deformation magnitude of plastic deformation required for regulating the internal stress by the pre-spinning of the superalloy disks, wherein the target deformation magnitude is 0.05%-1.95%;
wherein Step S1 comprises:
Step S11: obtaining a predicted revolution rate for regulating the internal stress in the superalloy disks by simulated calculation; Step S11 comprising:
Step S111: obtaining internal stress distribution of the superalloy disks by simulating heat treatment of the superalloy disks; Step S111 comprising:
obtaining the internal stress distribution of the superalloy disks after the heat treatment by detecting an actual internal stress in the superalloy disks and correcting a simulated result of the superalloy disks by using the actual internal stress; and
Step S112: simulating the pre-spinning of the superalloy disks by different revolution rates to determine the predicted revolution rate; wherein the pre-spinning by the predicted revolution rate enables the internal stress in the superalloy disks to be regulated to be 400 MP or below and enables residual deformation magnitude of the superalloy disks to be 0.05%-4.95%;
Step S12: performing the pre-spinning of the superalloy disks by the predicted revolution rate, and monitoring a deformation magnitude of the superalloy disks; and
Step S13: adjusting the predicted revolution rate according to the deformation magnitude of the superalloy disks to determine the target revolution rate; Step S13 comprising:
S131: determining the predicted revolution rate as the target revolution rate when the deformation magnitude of the superalloy disks reaches the target deformation magnitude when performing the pre-spinning of the superalloy disks by the predicted revolution rate; and
S132: when the deformation magnitude of the superalloy disks is lower than the target deformation magnitude when performing the pre-spinning of the superalloy disks by the predicted revolution rate, increasing a revolution rate of the pre-spinning until the deformation magnitude of the superalloy disks reaches the target deformation magnitude when performing a final revolution rate of the pre-spinning, and determining the final revolution rate as the target revolution rate; Step S132 comprising:
increasing the revolution rate of the pre-spinning by increments of 25-100 rotations per minute when the deformation magnitude of the superalloy disks is lower than the target deformation magnitude when performing the pre-spinning of the superalloy disks by the predicted revolution rate, wherein the deformation magnitude of the superalloy disks is monitored after keeping a current revolution rate for at least 30 seconds before moving to a next increment when performing the pre-spinning;
Step S2: performing the pre-spinning of the superalloy disks by the target revolution rate, monitoring the deformation magnitude of the superalloy disks, and stopping the pre-spinning when the deformation magnitude of the superalloy disks reaches the target deformation magnitude; and
Step S3: drawing an internal stress distribution diagram of the superalloy disks after the pre-spinning, Step S3 comprising:
Step S31: simulating the pre-spinning of the superalloy disks by the target revolution rate to obtain the internal stress distribution of the superalloy disks after the pre-spinning; and
Step S32: detecting an actual internal stress at a feature site of the superalloy disks, and correcting a simulated result of the superalloy disks after the pre-spinning by using the actual internal stress at the feature site to obtain the internal stress distribution of the superalloy disks after the pre-spinning, wherein when monitoring the deformation magnitude of the superalloy disks, a stable value is taken as the deformation magnitude of the superalloy disks, and when the deformation magnitude fluctuates in a range of ±0.01 mm within 15 s, the stable value is reached.

2. The method for internal stress regulation in superalloy disks made by powder metallurgy, casting or forging by pre-spinning according to claim 1, wherein the superalloy disks comprises annular disks, compressor disks and turbine disks.

3. The method for internal stress regulation in superalloy disks made by powder metallurgy, casting or forging by pre-spinning according to claim 1, wherein a pre-spinning operating temperature is −50° C.-750° C.

4. The method for internal stress regulation in superalloy disks made by powder metallurgy, casting or forging by pre-spinning according to claim 1, wherein the pre-spinning is performed by using a spinning test platform and a matched tool for positioning the superalloy disks on the spinning test platform.

\* \* \* \* \*